Oct. 1, 1963  K. HOBBS  3,105,623
METHOD OF SEPARATING INTO PIECES PLATES OF BRITTLE MATERIAL
Filed April 25, 1960
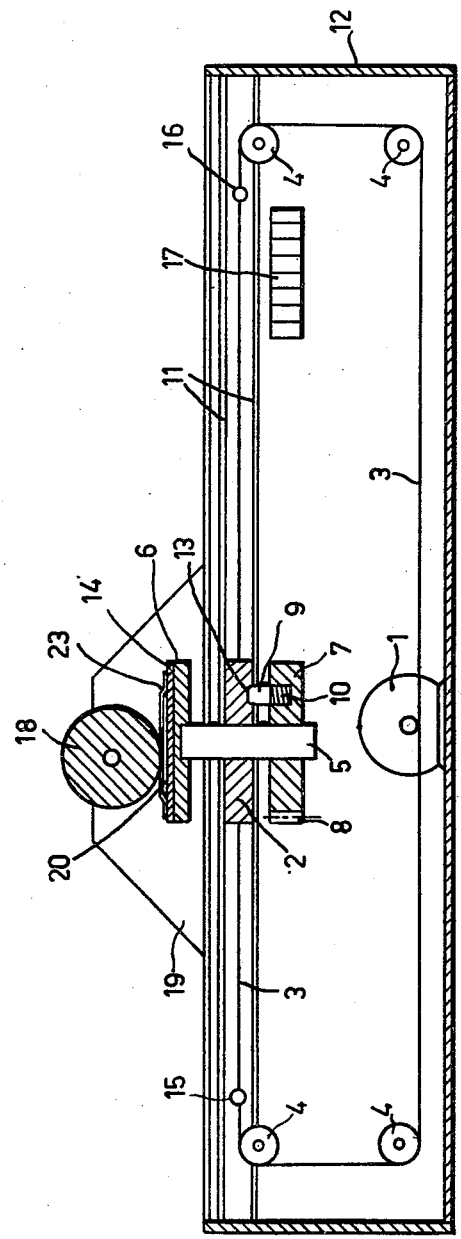
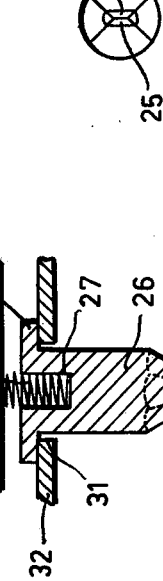
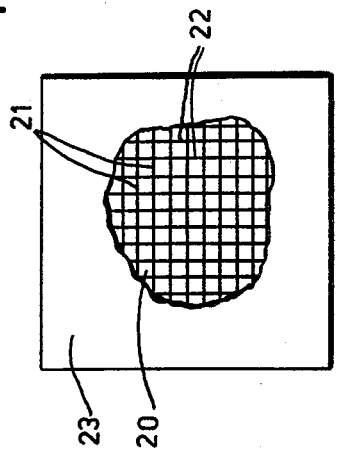
INVENTOR
KENNETH HOBBS
BY
Frank R. Trifari
AGENT

United States Patent Office 3,105,623
Patented Oct. 1, 1963

3,105,623
METHOD OF SEPARATING INTO PIECES PLATES OF BRITTLE MATERIAL
Kenneth Hobbs, Southampton, England, assignor to North American Philips Company, Inc., New York, N.Y., a corporation of Delaware
Filed Apr. 25, 1960, Ser. No. 24,327
Claims priority, application Great Britain May 12, 1959
3 Claims. (Cl. 225—99)

The present invention relates to methods of, and apparatus for, separating into pieces plates of brittle material and to pieces when separated by the method according to the present invention.

According to one aspect of the present invention, a method of separating into pieces a plate of brittle material having a plurality of score lines extending along the plate substantially parallel to one another and determining lines of separation, comprises the steps of moving the plate relative to at least one of two surfaces one on each side of the plate, the shape and resilience of the two surfaces being such that a bending moment is exerted on the plate by the two surfaces and moves progressively along the plate, whereby separation is effected by said bending moment along each score line in turn.

According to a second aspect of the present invention which is a modification of that according to the first aspect, the bending moment is exerted on the plate due to the nature and shape of the surfaces and the resilience of a layer of material interposed between the plate and one or each of the two surfaces.

The one surface may be substantially plane and the other substantially cylindrical, the plate being secured relative to the one surface and the plate and the one surface being moved relative to the other surface. The plate may be secured with the aid of a sheet of material having adhesive on each side.

The plate may have two sets of score lines extending at an angle to one another and separation effected along one set of score lines and thereafter separation is effected along the other set of score lines. In this case, the plate may be turned through an angle equal to that between the score lines after separation along one set of score lines and moved relative to the two surfaces a second time to effect separtion along the other set of score lines. The angle between the score lines may be substantially 90°.

The method may be applied to the separation into pieces of plates of semi-conductor material such as are obtained by sawing single crystals of germanium or silicon into slices.

According to a third aspect of the present invention, an apparatus for carrying out a method according to the present invention, comprises a platform having a substantially plane surface, a freely rotatable cylinder, means to move the platform along a straight line path so that its substantially plane surface travels in a plane to which the longitudinal axis of the cylinder is parallel, means to rotate the substantially plane surface in said plane through a determined angle after one completed movement relative to the cylinder and means to move the platform along a second path which is the reciprocal of the first path, the movement, and the resilience of the surface of the cylinder and the platform being such that, with a plate of brittle material having two sets of parallel score lines at said determined angle to one another on the substantially plane surface, with one set of score lines parallel to the longitudinal axis of the cylinder in the movement along the first path a bending moment is exerted on the plate by the two surfaces and moves progressively along the plate whereby separation is effected by said bending moment along each score line of one set in turn, and in the movement along the reciprocal path, the other set of score lines being parallel to the longitudinal axis of the cylinder after the rotation of the platform similar separation is effected along each score line of the other set in turn.

The means to rotate may comprise a toothed sector on the platform and a coacting stationary toothed rack.

One embodiment of a method and apparatus according to the present invention will now be described by way of example with reference to the accompanying drawing in which:

FIG. 1 is a vertical cross section on the line I—I of FIGURE 2, of an apparatus according to the present invention;

FIGURE 2 is a plan view of a scored slice of a semi-conductor single crystal mounted on an adhesive-coated support; and FIGURES 3 and 4 are an end view and a longitudinal cross section of a head for producing score lines on a crystal slice.

Referring now to FIGURE 1, the apparatus comprises a motor 1 which drives a supporting member 2 with the aid of a cord 3 and pulleys 4.

A shaft 5 is journalled through the member 2 and has secured to it, above the member 2, a platform 6 and below the member 2 a wheel 7 having a toothed segment 8. The wheel 7 has secured in it a projection 9 which can be depressed against the action of a coil spring 10.

The member 2 is supported at each side between a pair of projecting ribs 11 extending inwards from a casing 12 and has two depressions 13 spaced angularly 90° apart with reference to the shaft 5 and adapted to cooperate with the projection 9 to hold the platform 6 in either of two positions. In FIGURE 1 only one pair of ribs 11 is visible and only one of the two depressions 13.

The platform 6 has an upper layer 14 of rubber or felt which is resilient.

Two reversing switches 15 and 16 are secured near the ends of and within the casing 12 in positions in which they are actuated by being depressed by the member 2.

Two toothed racks 17 are secured near the ends of and within the casing 12 in positions in which they can coact with the toothed segment 8 to turn the shaft 5 and hence the platform 6 through an angle of 90°, the racks 17 causing the shaft to turn in opposite directions. Only one rack 17 is shown in FIGURE 1, the other rack being secured to the opposite side of the casing 12 and near the end of the casing 12 adjacent the switch 15.

A right-cylindrical roller 18 of less resilient material such as steel or cast iron is journalled so as to be freely rotatable in two members 19 projecting above the casing 12. The height of the roller 18 above the platform 6 is adjustable and preferably the roller 18 may readily be removed and be replaced by a similar roller of different diameter.

The operation of the apparatus is as follows:

With the member 2 in its extreme left-hand position, the motor 1 is switched on. The toothed rack (not shown) and the segment 8 are not in engagement in this position and the projection 9 is in the position shown in FIGURE 1.

A slice 20 of semi-conductor crystal scored along two sets of parallel, equi-distant lines 21 and 22 at right angles to one another is provided on a rectangle of paper tape 23 which is sticky on both sides, as shown in FIGURE 2. The slice 20 adheres to the tape 23 and the slice 20 and the tape 23 are placed with the score lines 21 and 22 downward on the layer 14 of the platform 6 and are held in position thereon by the sticky tape. One set of score lines 21 is positioned parallel to the axis of rotation of the roller 18, for example, with the aid of guide lines provided on the platform 6.

The motor 1 moves the cord 3 over the pulleys 4 and drives the supporting member 2 and hence the shaft 5 and the parts secured thereto towards the right-hand side of FIGURE 1.

The supporting member 2 is rectangular in horizontal cross-section and is held in position between the two pairs of ribs 11 so that it cannot turn and the platform 6 and the slice 20 are held in position by the projection 9 held in the depression 13 by the spring 10.

Each of the lines 21 passes beneath the roller 18 in turn and due to the small spacing between the roller 18 and the layer 14 and the greater resilience of the layer 14, as each line 21 passes directly beneath the roller 18 the slice 20 is deformed sufficiently for the line 21 to open into the depth of the slice 20 and to crack the slice apart in the vertical direction along each line 21 in turn. The bending moment produced by forces exerted upwards by the resilient layer 14 at each side of and the force exerted downwards by the roller 18 at the lowermost position of the roller 18 is not sufficient to break the slice 20 except at the score lines 21. The broken strips remain attached to the tape 23. The freely-rotatable roller 18 is driven round by the passage of the platform 6, the slice 20 and the tape 23 beneath it.

After passing beneath the roller 18, the member 2 continues to be driven to the right-hand side of FIGURE 1. The toothed segment 8 engages the stationary rack 17 so that the projection 9 is forced out of the one depression 13 and the wheel 7, the shaft 5 and the platform 6 are driven round through 90° about the shaft 5, when the extremity of the toothed segment 8 is reached and no longer engages the rack 17 and the projection 9 projects into the other depression 13. The lines 22 are now parallel to the horizontal axis of the roller 18. The member 2 next makes contact with and depresses the switch 16 so that electrical connection to the motor 1 is changed to reverse the direction of drive by the motor 1.

The platform 6 and the slice 20 are driven back beneath the roller and separation is effected along the lines 22.

At the left-hand end of the apparatus, the shaft 6 is again turned through 90° due to engagement of the segment 8 with the other rack 17 and the direction of travel of the platform 6 is reversed by depression of the switch 15 by the member 2. In the meantime, the tape 23 with the separated slice 20 adhering thereto is removed from the platform 6 and another slice 20 to be separated is positioned on the platform 6.

It will be obvious that, as an alternative, actuation of the switch 15 may reverse the motor connection and also stop the motor 1 to facilitate replacement of the slice 20, the motor 1 being thereafter restarted by a separate switch.

In the manner described above, it is found that semi-conductor slices may rapidly be separated into small rectangular pieces for further treatment in the manfacture of semi-conductive devices.

For the sake of completeness, FIGURES 3 and 4 show a head comprising a diamond for providing a score line on a semi-conductor slice. Such heads may be arranged in echelon with a desired lateral spacing and form part of an apparatus similar to that described with reference to FIGURE 1 except that the roller is omitted and the echelon of heads is arranged above the platform 6. Using tape sticky on both sides, a slice may be mounted on one side of the tape and the other side of the tape secured to the platform. One set of lines is provided during travel of the platform in one direction below the heads and the other set of lines, after rotation of the platform through 90°, during travel of the platform in the opposite direction. The scored slice, still on its tape, may then be transferred directly to the platform 6 of the apparatus described with reference to FIGURE 1.

A diamond fragment 24 having a straight-line cutting tip 25 is mounted in a holder 26. The holder 26 has an aperture 27 accommodating a coil spring 28 abutting at its other end against a top plate 29. The holder 26 has lugs 30 projecting to overlap the rim of an aperture 31 in a retaining plate 32.

In operation, a slice pushes the holder 26 upwards against the action of the spring 28 so that the pressure necessary for scoring is provided.

General considerations relating to the operation of the apparatus shown in FIGURE 1 are that the slower the travel of the slice 20 relative to the roller 18 the better the separating action, the layer 14 may be of relatively hard but still resilient rubber, and the greater distance between score lines, the larger it is desirable to make the diameter of the roller 18. In this latter connection, it is remarked that for score lines 2 mm. to 5 mm. apart a roller diameter of about ½ inch is satisfactory.

What is claimed is:

1. An apparatus for separating into sections a pre-scored stratum of germanium or silicon material comprising a table provided with a substantially flat, rotatable surface for mounting a stratum to be severed, an element having a toothed curved surface operatively connected to and positioned below said table, a cushioning layer on said table supporting said stratum, a freely rotatable roller for severing said stratum, means for moving said table rectilinearly into engagement with said freely rotatable roller such that the top surface of said table is located in a plane parallel to the longitudinal axis of the roller, a toothed rack engaging the teeth of said element after said table is moved into engagement with said roller and the latter severs the stratum in one direction to automatically rotate said table approximately 90° and thereafter said moving means drives said table in a reciprocal path and into engagement with said roller whereby said stratum is severed in a direction substantially at right angles to the initial cut.

2. An apparatus as claimed in claim 1 further comprising an adhesive paper affixed to a surface of said stratum for holding together the pieces of the severed stratum.

3. An apparatus for separating into sections a stratum of germanium or silicon material previously provided with two orthogonal sets of score lines comprising a table provided with a substantially flat rotatable surface for mounting stratum to be severed, an element having a curved, toothed surface operatively connected to and positioned below said table, a cushioning layer on said table supporting said stratum, a freely rotatable roller for severing said stratum having a cutting surface which is less resilient than said cushioning layer, and means for moving said table rectilinearly into engagement with said freely rotatable roller such that the top surface of said table is located in a plane parallel to the longitudinal axis of the roller, and the roller engages in said score lines to crack the stratum apart at said score lines, a toothed rack engaging the teeth of said element after said table is moved into engagement with said roller and the latter severs the stratum in one direction to automatically rotate said table approximately 90° and thereafter said moving means drives said table in a reciprocal path and into engagement with said roller whereby said stratum is severed in a direction substantially at right angles to the initial cut.

References Cited in the file of this patent

UNITED STATES PATENTS

| | | |
|---|---|---|
| 1,309,354 | Dallmeyer et al. | July 8, 1919 |
| 1,765,990 | Melville et al. | June 24, 1930 |
| 2,453,805 | Melhorn | Nov. 16, 1948 |
| 2,512,414 | Booth | June 20, 1950 |
| 2,555,916 | Clark | June 5, 1951 |
| 2,718,098 | Glendining | Sept. 20, 1955 |